United States Patent [19]

Jackson

[11] 4,262,608

[45] Apr. 21, 1981

[54] METHOD AND APPARATUS FOR POWERED FLUE PRODUCTS EXHAUST AND PREHEATED COMBUSTION AIR SUPPLY

[76] Inventor: Bert W. Jackson, 1219 Garfield Rd., Lansing, Mich. 48917

[21] Appl. No.: 48,508

[22] Filed: Jun. 14, 1979

[51] Int. Cl.³ .......................... F23L 17/00; F23H 3/08
[52] U.S. Cl. ..................................... 110/162; 110/163; 126/85 B; 431/215
[58] Field of Search .............. 110/206, 207, 162, 163; 126/85 B; 165/66; 431/215

[56] References Cited

U.S. PATENT DOCUMENTS

| 2,160,968 | 6/1939 | Hagen | 110/162 |
| 2,764,972 | 10/1956 | Ryder | 126/85 B |
| 2,818,060 | 12/1957 | Field | 126/85 B |
| 3,934,572 | 1/1976 | Teague | 431/215 X |

OTHER PUBLICATIONS

Jones, Paul J., *Power Venting of Gas Appliances*, Air Conditioning, Heating & Ventilating, vol. 57, No. 5, May 1960.

*Primary Examiner*—Edward G. Favors
*Attorney, Agent, or Firm*—Miller, Morriss & Pappas

[57] ABSTRACT

A combination powered flue products exhaust and preheated combustion air supply assembly is provided for use in association with a heating furnace so that flue exhaust products are given a positive exhaust to the outside while a balanced pre-heated combustion air supply is simultaneously and positively pulled inside. A compartmented main housing is provided having flue products exhaust and combustion air compartments. A flue products exhaust fan is provided in the flue products exhaust compartment and a simultaneously activated and driven combustion air intake fan is provided in the combustion air compartment. An outside air intake pipe is connected to the main housing so as to deliver combustion air to the combustion air compartment for delivery to the furnace area upon selective activation of the combustion air intake fan. A flue products exhaust pipe concentrically positioned within the air intake pipe is provided in association with the flue products exhaust compartment so as to deliver hot flue exhaust products to the outside atmosphere upon selective activation of the flue products exhaust fan. An automatic air pressure controlled air intake damper is provided in the air intake pipe so as to close the air intake pipe when the fans are not running. An automatic air pressure controlled flue products exhaust damper is provided in the flue products exhaust pipe so as to close the flue products exhaust pipe when the fans are not running.

5 Claims, 14 Drawing Figures

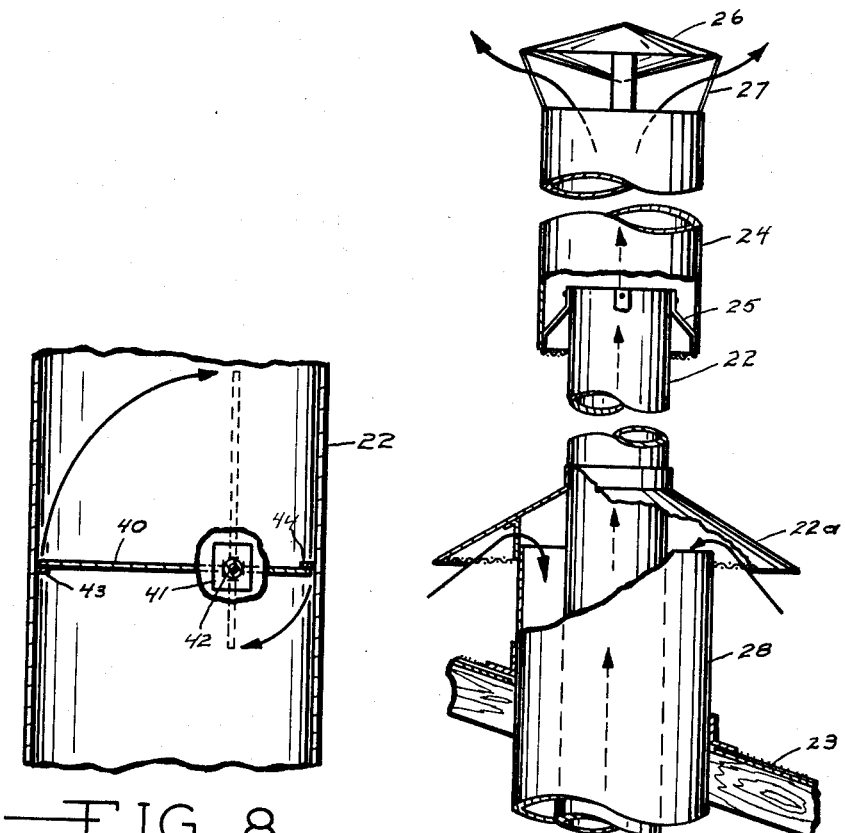
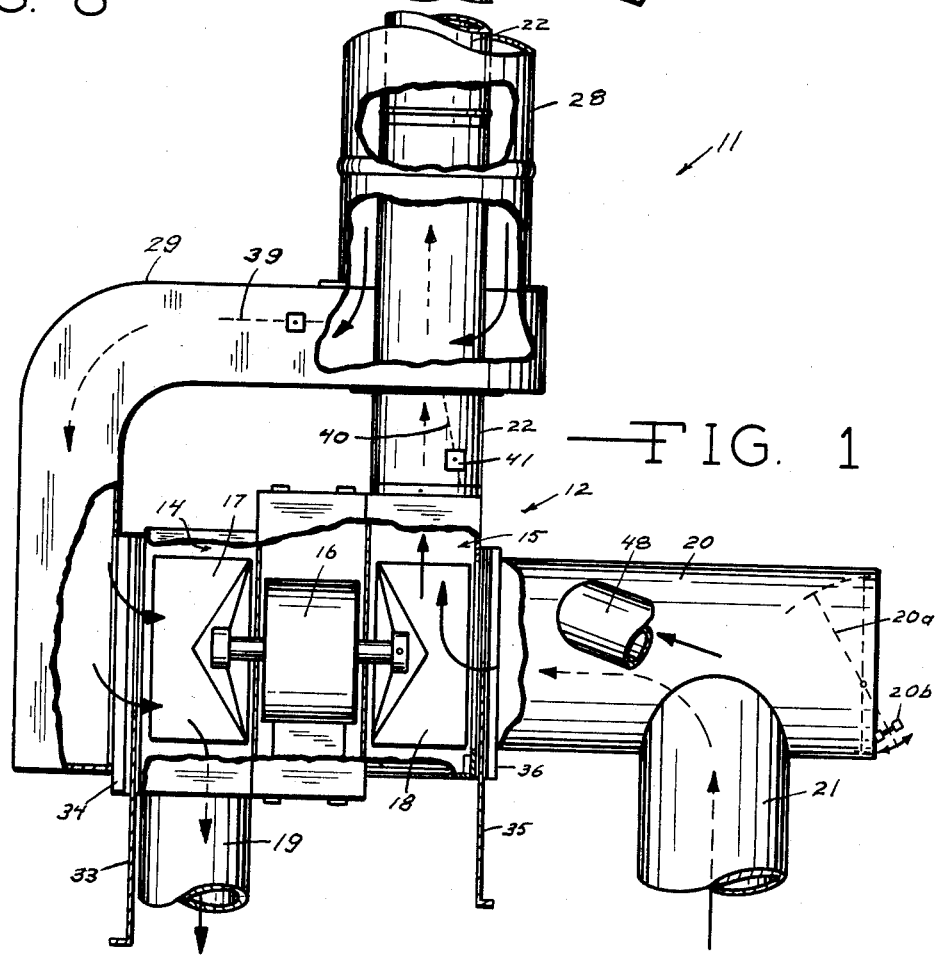
FIG. 8
FIG. 1

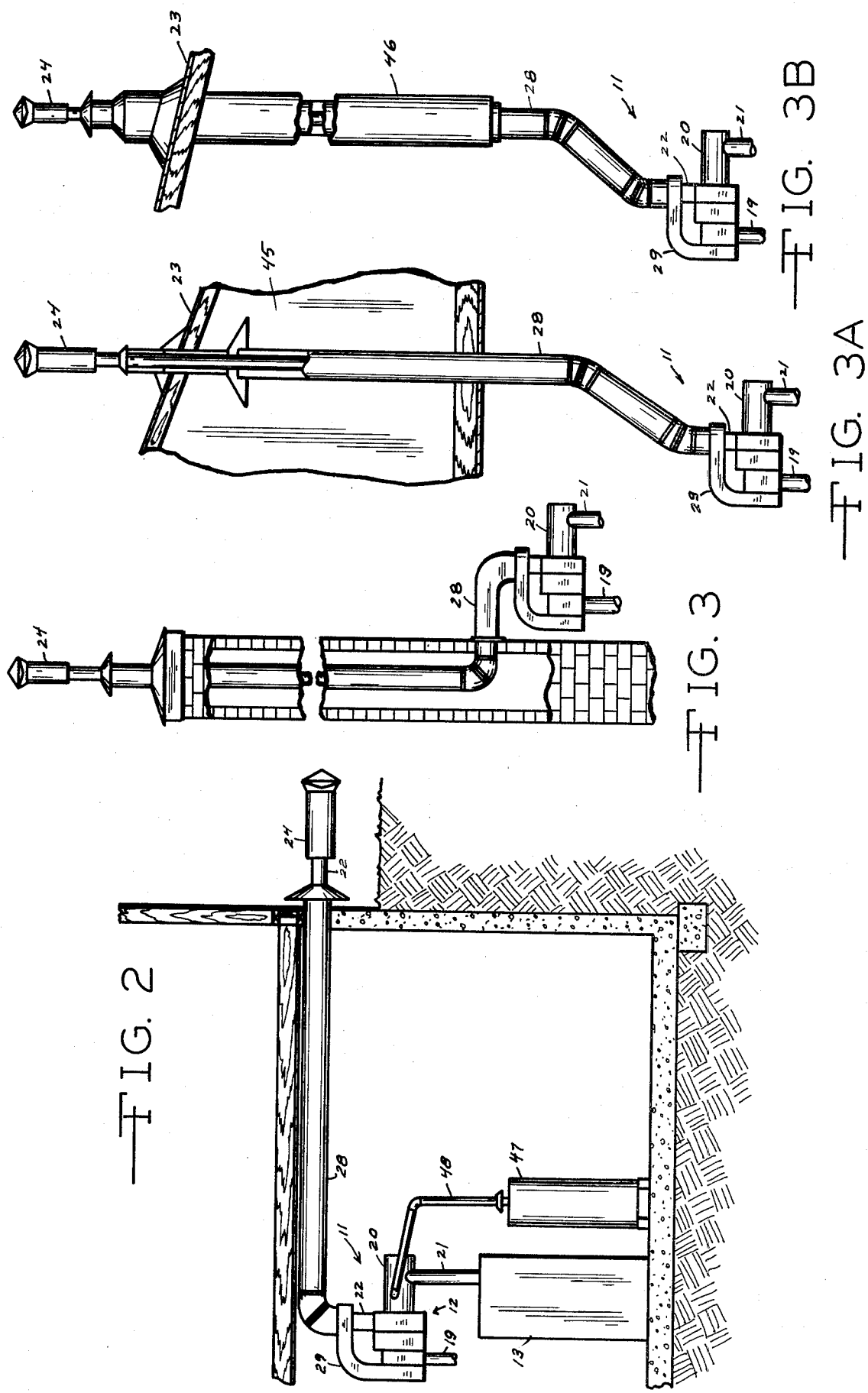

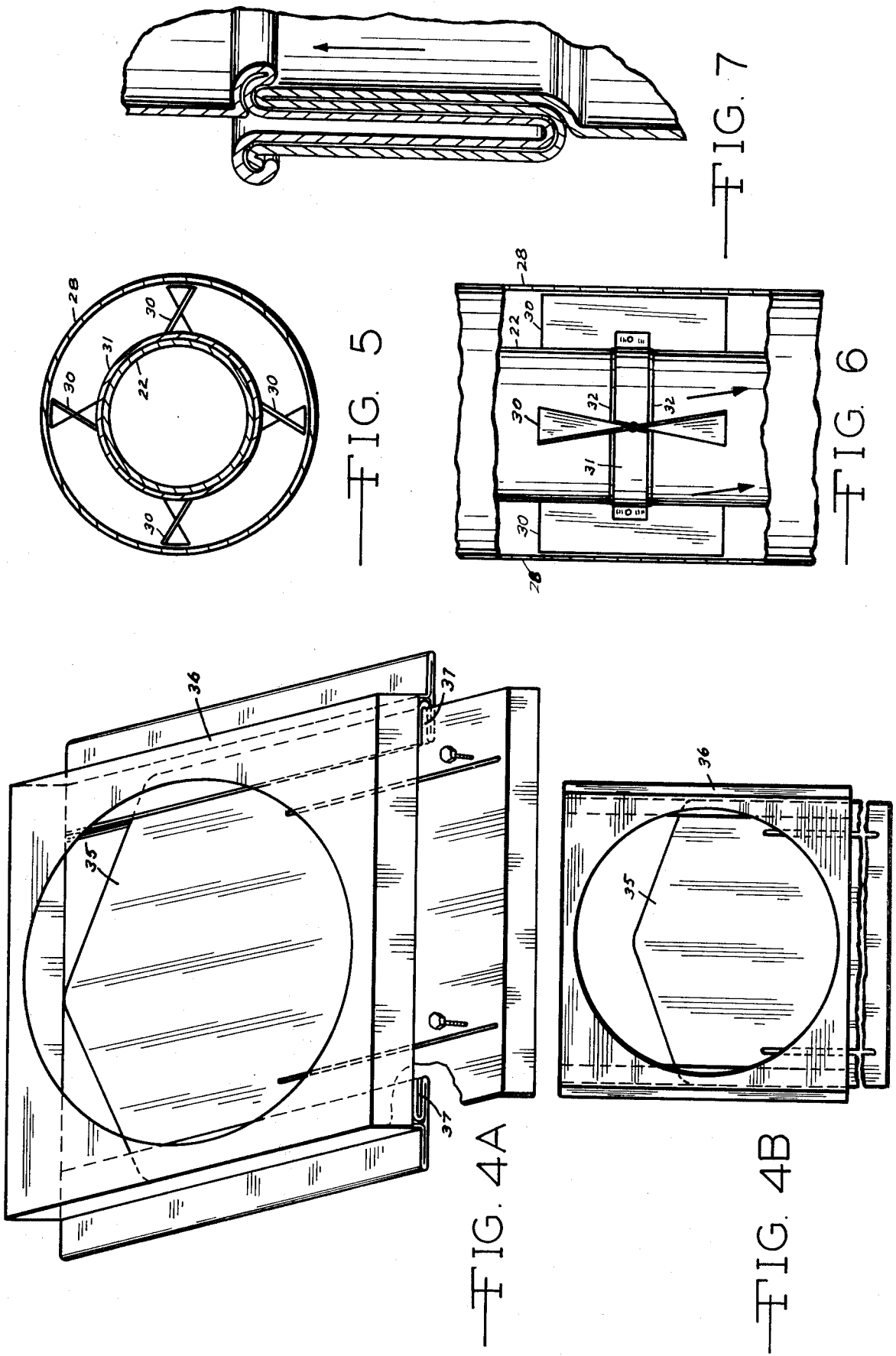

METHOD AND APPARATUS FOR POWERED FLUE PRODUCTS EXHAUST AND PREHEATED COMBUSTION AIR SUPPLY

SUMMARY OF THE INVENTION

This invention relates to a combination powered flue products exhaust and preheated combustion air supply assembly for use in association with a heating furnace so that flue exhaust products are given a positive exhaust to the outside while a balanced combustion air supply is positively pulled inside. A compartmented main housing is provided having flue products exhaust and combustion air compartments provided therein. A double-shafted electric drive motor is mounted in the main housing which simultaneously drives a flue products exhaust fan provided in flue products exhaust compartment and a combustion air intake fan provided in the combustion air compartment. An outside air intake pipe is connected to the main housing and extends to the exterior of the building so as to deliver combustion air to the combustion air compartment. A combustion air supply duct is provided in association with the main housing so as to selectively deliver preheated combustion air from the combustion air compartment to the furnace area upon activation of the combustion air intake fan. A dilution air manifold is provided on the main housing in open communication with the flue products exhaust compartment. The dilution air manifold is provided with an automatic dilution air control barometric damper so as to permit the selective introduction of dilution air thereinto. A flue products exhaust supply duct is provided in association with the dilution air manifold and the flue products exhaust outlet of the furnace so as to provide for delivery of flue exhaust products from the flue products exhaust outlet of the furnace to the dilution air manifold.

A flue products exhaust pipe is connected at one end therof to the main housing in open communication with the flue exhaust products compartment thereof. The flue products exhaust pipe is concentrically positioned within the outside air intake pipe and extends therethrough to the exterior of the building structure so as to deliver hot flue exhaust products from the flue products exhaust compartment to the outside atmosphere upon activation of the flue products exhaust fan. A vertical stackhead assembly is provided at the external outlet end of the flue products exhaust pipe so as to diffuse the flue exhaust products into the outside atmosphere while keeping outside precipitation from entering the flue products exhaust pipe. Curved steel deflector vanes are provided between the inside surface of the inside surface of the air intake pipe and the outside surface of the flue products exhaust pipe so as to enhance the transfer of heat from the outgoing flue exhaust products to heat the incoming combustion air passing simultaneously through the air intake pipe.

In response to simultaneous activation of the combustion air supply intake and flue products exhaust fans, outside air is drawn into the outside air intake so as to pass inwardly around the flue products exhaust pipe which is being heated by the outgoing hot flue exhaust products passing outwardly therethrough. Thus, preheated combustion air is delivered to the combustion air compartment and subsequently to the furnace area where it is available for use in the combustion chamber of the furnace.

Selectively adjustable air restrictor panels are provided in association with the main housing so as to selectively vary the size of the openings from the combustion air intake pipe into the combustion air compartment and from the dilution air manifold into the flue exhaust products compartment. The air restrictor panels are utilized to selectively regulate, balance and fix the amount of intake combustion air and flue exhaust products moving into the combustion air compartment and out of the flue exhaust products compartment, respectively.

An automatic air pressure controlled air intake daamper is provided in the air intake pipe proximate to the main housing so as to close the air intake pipe when the fans are not running. An automatic air pressure controlled flue products exhaust damper is provided in the flue products exhaust pipe proximate to the main housing so as to close the flue products exhaust pipe when the fans are not running.

It is thus seen that a combination powered flue products exhauster and a combustion air supplier is provided which is designed for and limited to vented gas burning devices or appliances. Due to the fuel energy crises, building structures are better insulated and more tightly constructed. This has resulted in decreasing the amount of combustion air available to furnaces. It is thus seen that the instant invention makes sufficient combustion air available to the furnace so as to provide for complete combustion of the fuel, hence effecting further energy savings. The instant invention provides additional energy savings in that it completely stops chimney action in the off cycle and permits only the very minimum of flue gas discharge during the burning cycle while simultaneously replacing that same exact amount of preheated combustion air, thus permitting the situation to remain neutral. By contrast, the conventional chimney always under a vacuum is without interruption taking tempered air from within the building at about 50 cubic feet per minute. Velocity will generally increase due to heat contributed from a vented appliance. This condition creates a negative pressure within the structure, accelerating the otherwise normal rate of infiltration, causing discomfort from drafts and cold areas, besides adding to the heat loss. The physics for chimney performance do not apply to the instant invention inasmuch as it is simply a push pull system providing power vent and power replaced air.

The use of the instant invention eliminates the hazards or dangers inherent in conventional chimneys. The structure of the invention must prove itself safe by its performance or its sequential operation is interrupted.

It is thus seen that the combination powered flue products exhauster and combustion air supplier provides such energy savings as to make the structure and system desirable as the original vent to a building or as a successor to chimneys or vents. The obsoleted chimney or vent could become a chase or void which can be used by the structure of the invention to reach the outside.

Thus, the instant invention obsoletes the need for conventional chimneys or vents. It obsoletes the need for ancillary flue restrictors. It permits more latitude in locating the furnace within the building, inasmuch as conventionally vented appliances are prohibited within bedrooms and bathrooms or with access through such rooms or space. It increases the efficiency of conventional gas furnaces. It enables oversized furnaces to be made effectively and efficiently smaller, simply by reducing the gas input. Reduced fuel input with coordinated exhaust quantities, automatically provides maximum furnace efficiency.

The completed assembly position, location and direction of termination point and size for capacity is inconsequential because the function and performance is accomplished by a totally powered mechanical means and not by the law of physics.

PRIOR ART

None of the known prior art devices show or otherwise anticipate a combination powered flue products exhaust and preheated combustion air supply assembly for use in association with a heating furnace so that flue exhaust products are given a positive exhaust to the outside while a balanced combustion air supply is positively pulled inside. Further, none of the prior art devices show the combination of air intake and flue exhaust pipes which automatically close when the furnace is not firing and/or the air intake and exhaust fans are not running, thus providing additional fuel savings through elimination of unnecessary heat loss. Examples of the known prior art are U.S. Pat. Nos. 1,074,194 to Pascoe, 1,074,195 to Pascoe, 1,089,728 to Smith, 1,308,194 to Rohan, 1,570,489 to Hill, 1,586,228 to Turek, 2,052,799 to Rifle, 2,108,033 to Cooper, 2,155,968 to Frees, 2,241,303 to Grebe, 2,286,853 to Holthouse, 2,286,856 to Holthouse, 2,299,901 to Johnston, 2,355,495 to Zier, 2,361,643 to Mueller, 2,474,090 to Carter, 2,496,505 to Thompson, 2,725,873 to Walter, 3,267,928 to Spooner, 3,580,237 to Barsby, 3,913,663 to Gates, 4,044,820 to Nobles and 4,083,398 to Fallon.

As described, the power unit consists of a dual compartment housing assembly which accommodates twin fans powered by a double-shafted electric motor. In motion, each fan delivers air in opposite directions, i.e. flue exhaust products are given a positive exhaust to the outside while combustion air is positively pulled inside.

The overall operation of the unit is selectively adjustable to fixed critical quantities, in cubic feet per minute. In the off cycle, air motion transfer (hence heat loss) is stilled by action of automatic dampers which selectively close the air intake and flue exhaust pipes when the fuel is not being burned in the combustion chamber of the furnace.

Thus, the instant invention avoids the use of energy wasting conventional chimney structures currently used. Further, the prior art devices do not provide a positive and adequate source of combustion air to the furnace. Thus, there generally is incomplete combustion resulting in additional waste of fuel and hence of energy. The instant invention insures sufficient combustion air to the furnace to provide for complete combustion.

The instant invention also provides greater flexibility in use in current and new building designs in that it is not limited to cumbersome and expensive chimney construction currently required with existing furnace installations.

The unique design of the applicant's structure wherein the flue exhaust pipe is concentrically positioned within the air intake pipe results in preheating of the intake air by utilizing the heretofore wasted heat of the flue products being exhausted.

It is therefore an object of this invention to provide a combination powered flue products exhauster and combustion air supplier which not only conserves energy but which has greater flexibility in use.

Other objects of this invention will be apparent to those skilled in the art upon reading the present description, drawings and claims.

IN THE DRAWINGS

FIG. 1 is a schematic side elevation view of the combination powered flue products exhaust and preheated combustion air supply assembly.

FIG. 2 s a schematic side elevation view of a modified form of the invention.

FIG. 3 is a schematic side elevation view of a modified form of the invention showing the air intake pipe and flue products exhaust pipe contained therein positioned within an existing chimney structure.

FIG. 3A is a schematic side elevation view of a modified form of the invention showing the air intake pipe in open communication with the ventilated attic of the building.

FIG. 3B is a schematic side elevation view of a modified form of the invention showing the air intake pipe assembly extending upwardly through an existing metal vent.

FIG. 4A is a schematic perspective view of the air restrictor panel and housing therefor.

FIG. 4B is a schematic cross-sectional view of the air restrictor panel and housing assembly in its operative use position.

FIG. 5 is a schematic cross-sectional view of the flue products exhaust pipe concentrically positioned within the fresh combustion air intake pipe and showing the intake air deflector vanes positioned therebetween.

FIG. 6 is a schematic side elevation breakaway view showing one of the air deflector vanes.

FIG. 7 is a schematic cross-sectional view showing the preferred interlock between the tubular sections used to fabricate the pipes.

FIG. 8 is a schematic cross-sectional breakaway showing the automatic air pressure controlled damper assembly in its operative use position within the air intake and flue products exhaust pipes, integral with micro-switch to prove air motion prior to energizing the gas burner.

DESCRIPTION OF A PREFERRED EMBODIMENT

Figure 9A:
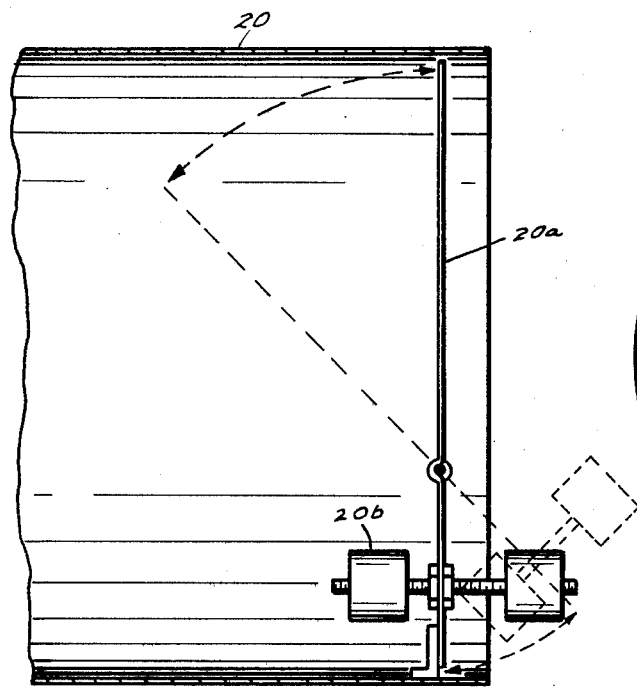
FIG. 9A is a schematic side view of the barometric dilution air damper assembly in its operative use position at the end of the dilution air manifold and illustrating the adjustable weight control means in association therewith.
Figure 9B:
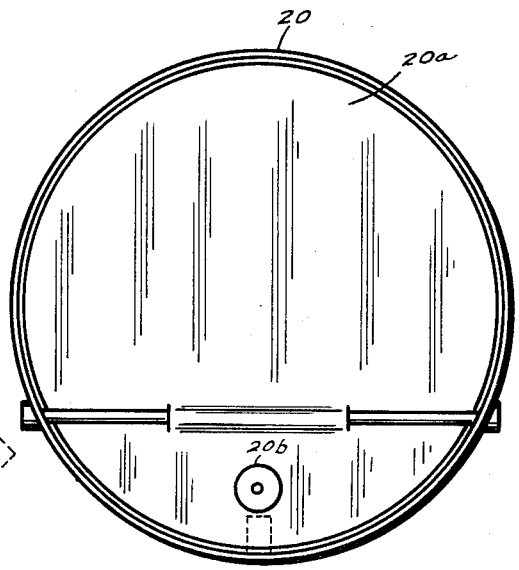
FIG. 9B is an end view of the dilution air manifold showing the barometric damper in its operative use position at the end thereof.

As shown in FIGS. 1 and 2, the combination powered flue products exhaust and preheated combustion air supply assembly 11 is provided with a compartmented main housing 12 which is positioned proximate to a heating furnace 13 generally located in the basement of a building structure.

The main housing 12 is provided with a combustion air intake compartment 14 and a flue products exhaust compartment 15. A double-shafted electric drive motor 16 is centrally positioned within the main housing 12 so as to simultaneously drive a combustion air intake fan 17 positioned within the combustion air compartment 14 and a flue products exhaust fan 18 positioned within the flue products exhaust compartment 15.

A combustion air supply duct 19 is provided in association with the main housing 12 in open communication with the combustion air compartment 14 so as to receive preheated combustion air therefrom and deliver it to the furnace area when the air intake fan 17 is activated.

A dilution air manifold 20 is provided on the main housing 12 in open communication with the flue exhaust products compartment 15. The outer end of the manifold 20 is provided with a pivotally-mounted dilution air control barometric damper 20a so as to permit the selective introduction of dilution air therinto. Adjustable weight means 20b are provided to selectively balance the damper 20a so that it responds to pressure changes within the manifold 20 so as to pivotally open and close upon demand. It is within the scope of the invention to provide a damper which is manually adjustable to fixed positions. A flue products exhaust supply duct 21 is attached to one end to the manifold 20 and is in open communication therewith. The flue products exhaust supply duct 21 extends to the flue products outlet of the furnace as provided by the furnace manufacturer. Upon activation of the flue products exhaust fan 18, the flue exhaust products pass from the combustion chamber of the furnace through the supply duct 21 into the manifold 20 and then into the flue exhaust products compartment 15. It is within the scope of the invention for the flue products exhaust supply duct 21 to be directly connected from the flue products exhaust outlet of furnace to the flue exhaust products compartment 15.

If desired, a gas hot water heater 47 can also be vented into the dilution air manifold 20 through exhaust duct 48 as shown in FIG. 2.

As shown in FIG. 1, a flue products exhaust pipe 22 is connected at one end thereof to the main housing 12 and is in open communication with the flue products exhaust compartment 15. The flue products exhaust pipe 22 extends vertically through the building structure, through the roof 23, so as to deliver the hot flue exhaust products from flue products exhaust compartment 15 to the outside atmosphere upon selective activation of the flue products exhaust fan 18. A tubular open-ended vertical stackhead assembly 24 is mounted over the upper end of the flue products exhaust pipe 22 by use of support straps 25. Thus suspended, the lower open end of the stackhead 24 extends below the upper end of the exhaust pipe 22. A deflector cap 26 having conically-shaped upper and lower surfaces is positioned above and spaced apart from the upper end of the flue exhaust pipe 22 by use of support straps 27. Thus positioned, the deflector cap 26 deflects the flue exhaust products into the atmosphere while preventing precipitation from entering the exhaust pipe 22.

An outside air intake pipe 28 is concentrically mounted around the flue exhaust pipe 22 so that the exhaust pipe 22 passes therethrough to the exterior of the building. The air intake pipe 28 extends through the building structure to the exterior above the roof 23. The flue products pipe 22 extends through and beyond the end of the air intake pipe 28. A downwardly extending circular canopy 22a is positioned on the flue exhaust pipe 22 above and spaced apart from the upper end of the air intake pipe 28 so as to permit the introduction of outside air into the air intake pipe 28 while preventing precipitation or other materials from falling thereinto.

The air intake pipe 28 and the flue products exhaust pipe 22 can be formed from tubular pipe sections which are joined together by use of a serpentine interlock and cap configuration shown in FIG. 7. It is within the scope of this invention to utilize other interlock configurations or methods of fabrication known in the art to form the pipes.

Another embodiment of the invention is shown in FIG. 2 whereby the air intake pipe 28 and the flue exhaust pipe 22 concentrically mounted therein are configured to extend horizontally outwardly through the exterior side wall of the building structure. This is possible due to the powered intake and power exhaust operation of the unit.

Another embodiment of the invention is shown in FIG. 3 whereby the air intake and flue exhaust pipes utilize an existing chimney as a chase to the exterior atmosphere. Other embodiments of the invention are shown in FIG. 3A wherein the air intake pipe 28 draws the make-up air from a vented attic 45 and in FIG. 3B the air intake pipe 28 utilizes an existing metal vent pipe 46 as to a chase to the outside.

The lower end of the air intake pipe 28 is positioned on and in open communication with the interior of a downwardly-curved plenum member 29 which is connected to the main housing. The plenum 29 is considered to be merely an extension of the intake pipe 28. The plenum member 29 is in open communication with the combustion air intake compartment 14 so that, upon activation of the combustion air intake fan 17, combustion intake air is drawn from the outside atmosphere downwardly through the air intake pipe 28 into the plenum member 29 and then into the combustion air intake compartment 14. As the outside air is drawn downwardly through the air intake pipe it is preheated by the flue exhaust pipe 22 which has been heated by hot flue exhaust products simultaneously moving upwardly therethrough. In response to the intake fan 17, the preheated outside combustion air then moves from the air intake compartment 14 through the air supply duct 19 into the furnace area where it is utilized by the furnace as needed to insure full combustion of the fuel.

In order to enhance the heating of the intake air by the hot flue exhaust pipe 22, a plurality of curved stainless steel vane blades 30 are mounted on a clamp band 31 attached to the exterior of the flue exhaust pipe 22 and are configured to extend proximate to the inside surface of the air intake pipe 28, as shown in FIGS. 5 and 6. Spaced-apart annular bead portions 32 are provided on the exterior of the flue exhaust pipe 22 so as to help maintain the clamp band 31 in its operative use position. Thus positioned, the vane blades 30 impart a swirling vortex-like movement to the downwardly descending intake air so as to enhance more uniform heating of the incoming air by providing more thorough "wiping" of the incoming air against the surface of the hot flue exhaust pipe 22. The vanes 30 also act as extensions of the heat exchanger surface so as to further enhance the heating of the incoming air. The vanes 30 further act as stabilizers and spacers between the flue exhaust pipe 22 and the air intake pipe 28.

As shown in FIG. 1, a selectively adjustable air restrictor panel 33 is mounted within a housing 34 attached to the main housing 12. The air restrictor panel 33 can be moved to selectively vary the size of the opening from the combustion air intake plenum 29 into the combustion air compartment 14. Similarly, an air restrictor panel 35 provided in housing 36 can be used to selectively vary the size of the opening from the dilution air manifold 20 into the flue exhaust products compartment 15. As shown in FIGS. 4A and 4B, the housing 36 is provided with guideways 37 which are configured to slidably receive the air restrictor panel 35 between the dilution air manifold 20 and the flue exhaust products compartment 19. The air restrictor panel 33 and housing 34 are similarly configured so as to selectively vary the size of the opening between the plenum 29 and the combustion air compartment 14. The use of the slide restrictor panels makes the unit universally adaptable to all installations. The same motor and fans can be used in every installation by merely adjusting the panels 33 and 35 to vary the air quantities involved and for the flue gas temperature desired.

Figure 10:
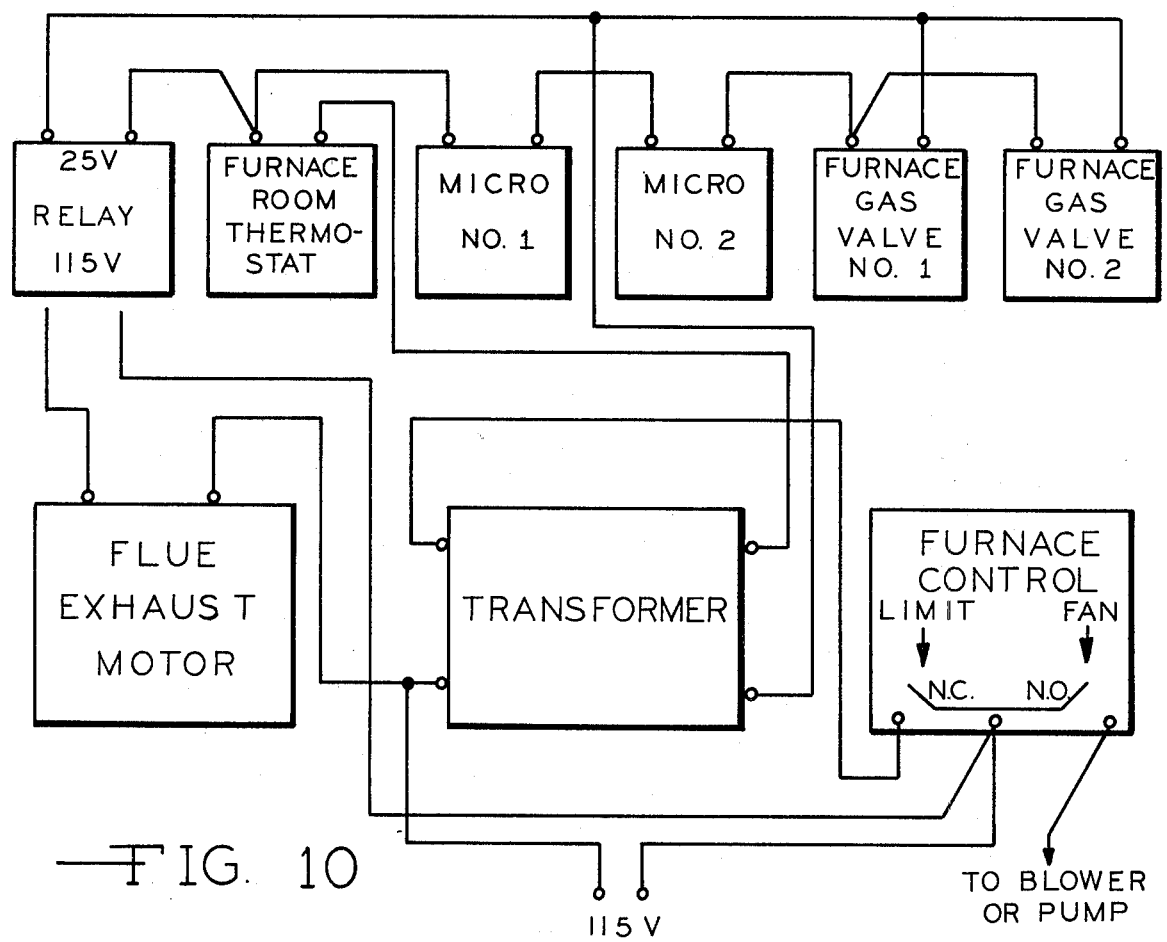
FIG. 10 is a schematic diagram showing the electrical control circuitry.

Automatic air pressure controlled dampers 39 and 40 are pivotally mounted within the air intake pipe plenum 29 and flue exhaust pipe 22, respectively, so as to selectively close the air intake pipe 28 and the flue products exhaust pipe 22 when the fans are not running. As shown in FIG. 8, each damper blade 39 and 40 is pivotally mounted with its respective air intake plenum 29 (air intake pipe 28) and flue exhaust pipe 22. A cam-operated micro-switch 41 is provided on the damper blade support shaft 42. Limit stops 43 and 44 maintain each damper blade 39 and 40 in its closed position. When the fans 17 and 18 are shut off, each of the damper blades 39 and 40 automatically closes due to lack of air movement through the air intake pipe 28 and the flue products exhaust pipe 22, respectively. This closes the micro-switch 41 which opens the circuit, thereby shutting off the furnace gas valve. Thus, this circuitry acts as a safeguard in the event of blower failure. When the fans are activated, the inward movement of the intake air and the outward movement of the flue products exhaust cause each of the damper blades 39 and 40 to open, thus closing its respective micro-switch 41 so as to close the circuit. This completes the low voltage circuitry so as to actuate (open) the gas valve so that the furnace can operate. The electrical control circuitry of this structure is shown in the schematic diagram of FIG. 10. The designation FLUE EXHAUST MOTOR actually refers to the drive motor 16 which simultaneously drives the air intake fan 17 and the flue products exhaust fan 18. A second redundant gas valve is added for A.G.A. acceptance. The wiring diagram relay to the motor 16 is wired direct from the source, i.e. the center post of combination fan and limit control. The relay to the flue exhauster is designed to perform instant on and ten second delay on shut down. The furnace thermostat makes and breaks to the relay and micro-switches, simultaneously.

It is thus seen that this invention provides a combination powered flue products exhaust and preheated combustion air supply assembly for use in association with a heating furnace which results in overall energy savings. This invention eliminates the need for a standard chimney which is extremely wasteful in that it unnecessarily extracts large amounts of heated air from the building. The use of air pressure controlled dampers in this invention to automatically close the air intake and flue exhaust pipes when the furnace is not in its firing cycle further eliminates heat loss. This powered system also provides sufficient preheated combustion air to the furnace so as to insure complete combustion of the fuel, thus providing additional energy savings not found in the furnaces of the prior art.

From this presentation of an operative embodiment of my invention, improvements, modifications and substitutions will become apparent to those skilled in the art. Such improvements, modifications and substitutions are intended to be included within the spirit of the invention limited only by the scope of the hereinafter appended claims.

I claim:

1. In a combination powered flue products exhaust and preheated combustion air supply assembly for use in association with a heating furnace comprising:
   (a) a compartmented main housing, said main housing defining a combustion air supply compartment and flue products exhaust compartment therein, said combustion air supply compartment provided with a combustion air intake fan mounted therein and said flue products exhaust compartment provided with a flue products exhaust fan mounted therein;
   (b) a double-shafted drive motor mounted in said main housing so as to simultaneously drive said combustion air intake fan and said flue products exhaust fan;
   (c) an outside air intake pipe provided on said main housing in open communication with said combustion air supply compartment, said outside air intake pipe configured to extend to the exterior of the building in which it is mounted so as to provide outside air to said combustion air supply compartment;
   (d) a combustion air supply duct provided on said main housing in open communication with said combustion air supply compartment, said combustion air supply duct configured to convey combustion air to the furnace area;
   (e) a flue products exhaust supply duct provided on said main housing in open communication with said flue products exhaust compartment, said flue products supply duct connected to the flue products exhaust outlet of the furnace so as to deliver hot flue exhaust products therefrom to the said flue products exhaust compartment;
   (f) a flue products exhaust pipe provided on said main housing in open communication with said flue products exhaust compartment, said flue products exhaust pipe concentrically mounted within said air intake pipe so as to extend therethrough to the exterior of the building to deliver the hot flue products to the outside atmosphere, said flue products exhaust pipe adapted to transmit heat from hot flue exhaust products passing outwardly therethrough to preheat combustion air passing inwardly through said air intake pipe; and
   (g) automatic air pressure controlled dampers provided in said combustion air intake pipe and said flue products exhaust pipe so as to selectively close said intake air and flue products exhaust pipes when said fans are not running.

2. In the combination powered flue products exhaust and preheated combustion air supply assembly of claim 1 wherein a vertical stackhead assembly is provided on the external outlet end of said flue products exhaust pipe, said vertical stackhead assembly configured to diffuse the hot flue exhaust products passing from said flue products exhaust pipe into the outside atmosphere.

3. In the combination powered flue products exhaust and preheated conmbustion air supply assembly of claim 1 wherein a dilution air manifold is provided on said main housing in open communication with said flue products exhaust compartment and said flue products exhaust supply duct, said dilution air manifold having an automatic dilution air control barometric damper so as to permit selective introduction of dilution air in said dilution air manifold.

4. In the combination powered flue products exhaust and preheated combustion air supply assembly of claim 1 wherein selectively adjustable air restrictor panels are provided on said main housing so as to selectively vary the size of the openings between said combustion air intake pipe and said combustion air compartment and between said flue products exhaust supply duct and said flue products exhaust compartment.

5. In a combination powered flue products exhaust and preheated combustion air supply assembly for use in association with a heating furnace comprising:
 (a) a compartmented main housing, said main housing defining a combustion air supply compartment and flue products exhaust compartment therein, said combustion air supply compartment provided with a combustion air intake fan mounted therein and said flue products exhaust compartment provided with a flue products exhaust fan mounted therein;
 (b) means to simultaneously drive said combustion air intake fan and said flue products exhaust fan;
 (c) an outside air intake pipe provided on said main housing in open communication with said combustion air supply compartment, said outside air intake pipe configured to extend to the exterior of the building in which it is mounted so as to provide ouside air to said combustion air supply compartment;
 (d) a flue products exhaust pipe provided on said main housing in open communication with said flue products exhaust compartment, said flue products exhaust pipe configured to extend to the exterior of the building to deliver hot flue products to the outside atmosphere; and
 (e) automatic air pressure controlled dampers provided in said combustion air intake pipe and said flue products exhaust pipe so as to selectively close said intake air and flue products exhaust pipes when said fans are not running.

* * * * *